US011711692B2

(12) United States Patent
Marquardt et al.

(10) Patent No.: US 11,711,692 B2
(45) Date of Patent: *Jul. 25, 2023

(54) HARDWARE-TRUSTED LEDGER CLIENT FOR DISTRIBUTED LEDGERS THAT SERVE WIRELESS NETWORK SLICES (71) Applicant: Sprint Communications Company L.P., Overland Park, KS (US)

(72) Inventors: Ronald R. Marquardt, Woodinville, WA (US); Arun Rajagopal, Leawood, KS (US); Lyle Walter Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/195,151

(22) Filed: Mar. 8, 2021

(65) Prior Publication Data

US 2021/0195421 A1 Jun. 24, 2021

Related U.S. Application Data (63) Continuation of application No. 16/181,695, filed on Nov. 6, 2018, now Pat. No. 10,986,500.

(51) Int. Cl.
*G06F 16/18* (2019.01)
*H04W 12/069* (2021.01)
(Continued)

(52) U.S. Cl.
CPC ...... *H04W 12/069* (2021.01); *G06F 16/1805* (2019.01); *H04L 9/0643* (2013.01);
(Continued)

(58) Field of Classification Search
CPC .............. H04W 12/0609; H04W 48/18; H04W 12/04031; G06F 16/1805; H04L 63/062;
(Continued)

(56) References Cited

U.S. PATENT DOCUMENTS 8,839,368 B2  9/2014 Grube et al.
9,197,543 B2  11/2015 Brendel et al.
(Continued)

FOREIGN PATENT DOCUMENTS

WO  2017220115 A1  12/2017
WO  2018109598 A1  6/2018
WO  2018162687 A1  9/2018

*Primary Examiner* — Jeffrey C Pwu
*Assistant Examiner* — Nega Woldemariam (57) ABSTRACT A wireless communication network serves a wireless user device with a wireless communication service from a wireless network slice that includes a Virtual Network Function (VNF). The VNF maintains hardware-trust with a distributed ledger. The distributed ledger maintains hardware-trust with the VNF. The VNF delivers the wireless communication service to the wireless user device from the wireless network slice. The VNF generates slice data that characterizes the service delivery. When the VNF maintains the hardware-trust with the distributed ledger, the VNF transfers the slice data to the distributed ledger. When the distributed ledger maintains the hardware-trust with the VNF, the distributed ledger stores the slice data.

20 Claims, 8 Drawing Sheets (51) Int. Cl.
*H04W 48/18* (2009.01)
*H04L 9/40* (2022.01)
*H04L 9/06* (2006.01)
*H04W 12/0431* (2021.01)
*H04L 9/00* (2022.01)

(52) U.S. Cl.
CPC ........ *H04L 63/062* (2013.01); *H04L 63/0823* (2013.01); *H04W 12/0431* (2021.01); *H04W 48/18* (2013.01); *H04L 9/50* (2022.05)

(58) Field of Classification Search
CPC .............. H04L 9/0643; H04L 63/0823; H04L 2209/38
USPC .......................................................... 713/156
See application file for complete search history.

(56) References Cited

U.S. PATENT DOCUMENTS

| | | |
|---|---|---|
| 2009/0094318 A1 | 4/2009 | Gladwin et al. |
| 2016/0012424 A1 | 1/2016 | Simon et al. |
| 2016/0219076 A1* | 7/2016 | Paczkowski ............ G06F 21/57 |
| 2016/0260169 A1 | 9/2016 | Arnold et al. |
| 2017/0230375 A1 | 8/2017 | Kurian |
| 2018/0139042 A1 | 5/2018 | Binning et al. |
| 2018/0197156 A1 | 7/2018 | Beesley et al. |
| 2020/0057860 A1* | 2/2020 | Patil .................... G06F 21/6209 |

\* cited by examiner

HARDWARE-TRUSTED LEDGER CLIENT FOR DISTRIBUTED LEDGERS THAT SERVE WIRELESS NETWORK SLICES

RELATED CASES

This United States patent application is a continuation of U.S. patent application Ser. No. 16/181,695 that was filed on Nov. 6, 2018 and is entitled "HARDWARE-TRUSTED LEDGER CLIENT FOR DISTRIBUTED LEDGERS THAT SERVE WIRELESS NETWORK SLICES." U.S. patent application Ser. No. 16/181,695 is hereby incorporated by reference into this United States patent application.

TECHNICAL BACKGROUND

Wireless data networks serve wireless user devices with mobile data services like video streaming, internet access, and voice calling. The wireless data networks have RANs that exchange user data over the air with the wireless user devices. The wireless data networks also have Network Function Virtualization Infrastructures (NFVIs) that are directed by Management and Orchestration (MANO) systems. The MANO systems implement Network Service Descriptors (NSDs) to control the NFVIs. The NFVIs execute Virtual Network Functions (VNFs) responsive to the MANO system control. To deliver the wireless data services, the user devices communicate with wireless access points, and the wireless access points communicate with the VNFs that are running in the NFVIs.

A network slice comprises a virtual portion of the wireless data network. The network slice may be an end-to-end network, core network, access network, or combinations thereof. To form a network slice, a network slice controller instructs the NFV MANO system to implement an NSD for the network slice. The NFV MANO system directs the NFVI to run the VNFs for the network slice based on the NSD. The network slice controller also instructs the RANs for the network slice to serve the wireless user devices for the network slice. The network slice controller may configure the wireless user devices on the network slice. To deliver wireless data services within the network slice, the wireless user devices communicate with the RANs in the network slice. The RANs communicate with the VNFs in the network slice that are running in the NFVIs for the network slice.

A distributed ledger comprises multiple computer nodes that process the same data inputs with the same chain code to generate the same data outputs in parallel with one another. The computer nodes reach consensus and store these same data inputs/outputs in immutable ledger blocks. For example, the computer nodes may reach a consensus on a user's payment amount before storing the payment amount in the ledger blocks. The distributed ledger receives data inputs from ledger clients and transfers data outputs to ledger clients. These ledger clients are connected to other various systems—including wireless data networks that deploy wireless network slices. Unfortunately, the ledger clients do not effectively couple wireless network slices to distributed ledgers during slice deployment.

TECHNICAL OVERVIEW

A wireless communication network serves a wireless user device with a wireless communication service from a wireless network slice that includes a Virtual Network Function (VNF). The VNF maintains hardware-trust with a distributed ledger. The distributed ledger maintains hardware-trust with the VNF. The VNF delivers the wireless communication service to the wireless user device from the wireless network slice. The VNF generates slice data that characterizes the service delivery. When the VNF maintains the hardware-trust with the distributed ledger, the VNF transfers the slice data to the distributed ledger. When the distributed ledger maintains the hardware-trust with the VNF, the distributed ledger stores the slice data.

DETAILED DESCRIPTION

Figure 1:
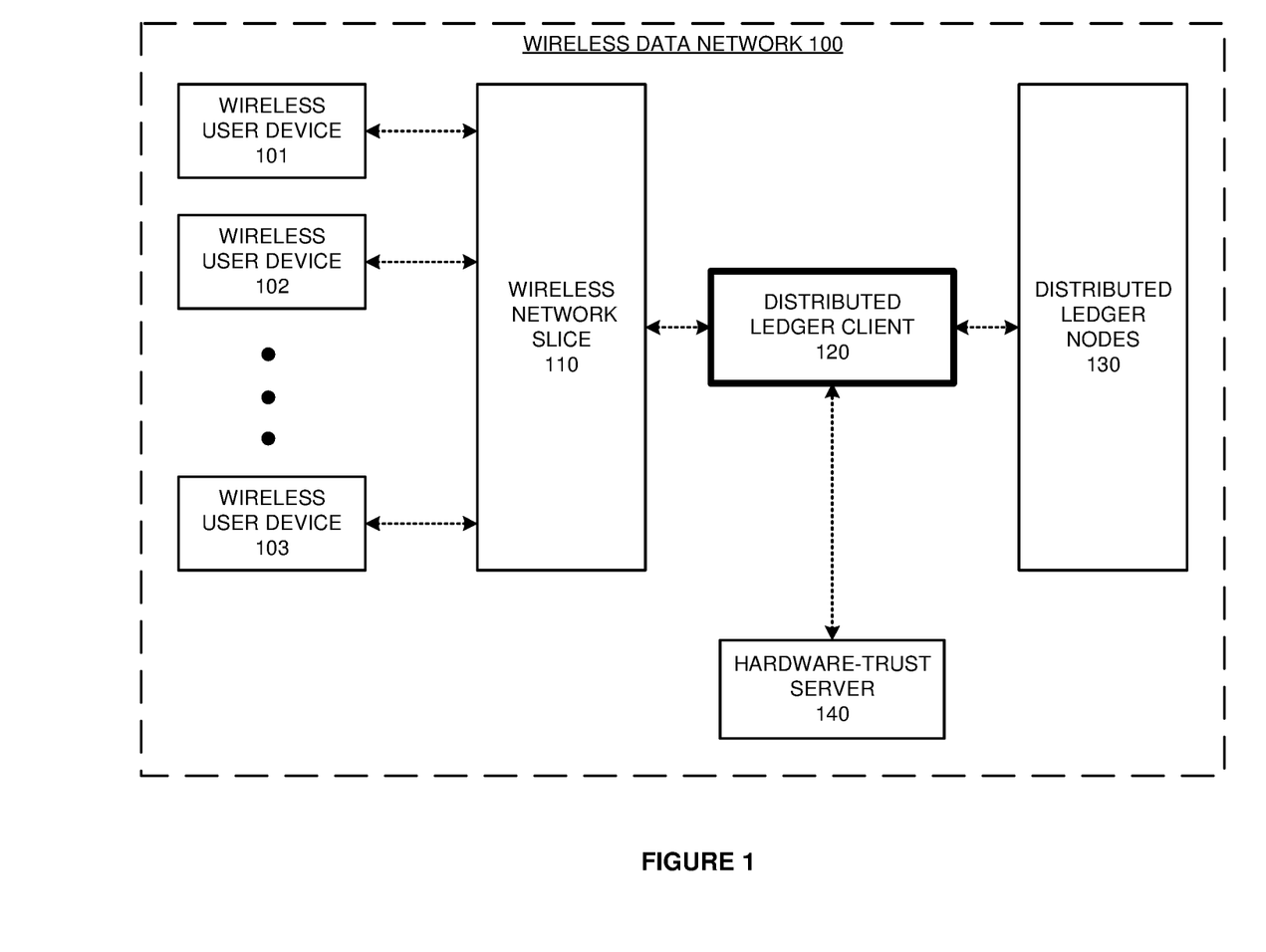
FIG. 1 illustrates a wireless data network that stores slice data from wireless network slices in distributed ledger nodes.

FIG. 1 illustrates wireless data network 100 that stores slice data from wireless network slice 110 in distributed ledger nodes 130. Wireless data network 100 comprises wireless user devices 101-103, wireless network slice 110, distributed ledger client 120, distributed ledger nodes 130, and hardware-trust server 140. The number of wireless user devices, wireless network slices, ledger clients, and ledgers in wireless data network 100 is typically far higher, but the amount shown has been restricted for clarity.

Wireless network slice 110 processes user data for user devices 101-103 to deliver various communication services like short messaging, internet-access, voice-calling, machine-to-machine communications, media streaming, and the like. Wireless network slice 110 generates and transfers slice data to ledger client 120 that characterizes this service delivery. Ledger client 120 transfers the slice data to distributed ledger nodes 130. Distributed ledger nodes 130 store the slice data. Advantageously, distributed ledger client 120 establishes hardware-trust within wireless data network 100 before transferring slice information from wireless network slice 110 to distributed ledger nodes 130. Moreover, wireless data network 100 controls slice/client pairings and ledger/client pairings through ledger client 120.

Wireless user devices 101-103 comprise computers, phones, headsets, graphic displays, vehicles, drones, sensors, or some other wireless communication apparatus. Wireless user devices 101-103 execute user applications like video streaming, vehicle control, remote computing, virtual reality, machine-to-machine communications, and internet access. Wireless user devices 101-103 comprise wireless transceiver circuitry and baseband circuitry. The wireless transceiver circuitry comprises antennas, modulators, amplifiers, filters, digital/analog interfaces, Digital Signal Processors (DSPs), memory circuitry, firmware/software, and bus circuitry. The wireless transceiver circuitry uses wireless network protocols like Fifth Generation New Radio (5GNR), Long Term Evolution (LTE), and Institute of Electrical and Electronic Engineers 802.11 (WIFI). The baseband circuitry comprises processing circuitry, memory circuitry, software, bus circuitry, and network transceiver circuitry. The processing circuitry comprises Central Processing Units (CPUs), Graphics Processing Units (GPUs), Application Specific Integrated Circuits (ASICs), and the like. The memory circuitry comprises volatile and non-volatile data storage like Random Access Memory (RAM), cache memory, flash drives, disk drives and the like. The network transceiver circuitry comprises computer Input/Output (I/O) ports, memory, and DSPs. The memory circuitry stores operating systems and network applications for Physical Layer (PHY), Media Access Control (MAC), Radio Link Control (RLC), Packet Data Convergence Protocol (PDCP), Radio Resource Control (RRC), Service Data Application Protocol (SDAP), slice access, ledger access, hardware-trust, and the like.

Wireless network slice 110 comprises computer hardware and software components that deliver at least a portion of the communication services to wireless user devices 101-103. Wireless network slice 110 typically comprises core network elements and may also include Radio Access Network (RAN) elements and/or user devices. The RAN elements have wireless transceiver circuitry and baseband circuitry. The wireless transceiver circuitry comprises antennas, modulators, amplifiers, filters, digital/analog interfaces, DSPs, memory circuitry, firmware/software, and bus circuitry. The transceiver circuitry uses wireless network protocols like 5GNR, LTE, and WIFI. The baseband circuitry comprises processing circuitry, memory circuitry, software, bus circuitry, and network transceiver circuitry. The processing circuitry comprises CPUs, GPUs, ASICs, and the like. The memory circuitry comprises volatile and non-volatile data storage like RAM, cache memory, flash drives, disk drives and the like. The network transceiver circuitry comprises computer Input/Output (I/O) ports, memory, and DSPs. The memory circuitry stores operating systems and network applications for the PHY, MAC, RLC, PDCP, RRC, SDAP, hardware-trust, slice control, ledger access, and the like. In some examples, the RANs comprise Network Function Virtualization (NFV) hardware that hosts NFV virtual layers, Management and Orchestration (MANO), Virtual Network Functions (VNFs), and the like.

In wireless network slice 110, the network core comprises processing circuitry, memory circuitry, software, bus circuitry, and network transceiver circuitry. The processing circuitry comprises CPUs, GPUs, ASICs, and the like. The memory circuitry comprises volatile and non-volatile data storage like RAM, cache memory, flash drives, disk drives and the like. The network transceiver circuitry comprises computer I/O ports, memory, and DSPs. The memory circuitry stores operating systems, virtual machines, network applications, and the like. The network applications perform networking functions like: hardware-trust, slice controller, Ledger Gateway (L-GW), Access and Mobility Management Function (AMF), Authentication Server Function (AUSF), Unified Data Management (UDM), Policy Control Function (PCF), Session Management Function (SMF), Application Function (AF), Mobility Management Entity (MME), Home Subscriber System (HSS), Serving Gateway (S-GW), Packet Data Network Gateway (P-GW), Policy Charging Rules Function (PCRF), Internet Protocol Multimedia Subsystem (IMS), and possibly other network functions. In some examples, the network core comprises NFV hardware that hosts NFV virtual layers, MANO, VNFs, and the like.

Distributed ledger client 120 comprises processing circuitry, memory circuitry, software, bus circuitry, and transceiver circuitry. The processing circuitry comprises CPUs, GPUs, ASICs, and the like. The memory circuitry comprises volatile and non-volatile data storage like RAM, cache memory, flash drives, disk drives and the like. The transceiver circuitry comprises computer I/O ports, memory, and DSPs. The memory circuitry stores operating systems, hardware-trust applications, ledger client applications, and the like. In some examples, distributed ledger client 120 comprises NFV hardware that hosts NFV virtual layers, MANO, VNFs, and the like. Distributed ledger client 120 may be integrated within wireless network slice 110 and/or ledger nodes 130.

Distributed ledger nodes 130 comprise multiple computers that are coupled over one or more data networks. Distributed ledger nodes 130 operate in parallel to execute ledger applications that are referred to as "chain code." Distributed ledger nodes 130 reach consensus on new slice data and store the new slice data across the nodes. The ledger applications also generate data output, and distributed ledger 130 reaches consensus on new data output before storage and transfer. Distributed ledger nodes 130 comprise processing circuitry, memory circuitry, software, bus circuitry, and transceiver circuitry. The processing circuitry comprises CPUs, GPUs, ASICs, and the like. The memory circuitry comprises volatile and non-volatile data storage like RAM, cache memory, flash drives, disk drives and the like. The transceiver circuitry comprises computer I/O ports, memory, and DSPs. The memory circuitry stores operating systems, endorsement applications, order service applications, ledger applications, and databases. In some examples, distributed ledger nodes 130 comprise NFV hardware that hosts NFV virtual layers, MANO, VNFs, and the like. Distributed ledger nodes 130 may be integrated within wireless network slice 110.

Hardware-trust server 140 comprises processing circuitry, memory circuitry, software, bus circuitry, and transceiver circuitry. The processing circuitry comprises CPUs, GPUs, ASICs, and the like. The memory circuitry comprises volatile and non-volatile data storage like RAM, cache memory, flash drives, disk drives and the like. The transceiver circuitry comprises computer I/O ports, memory, and DSPs. The memory circuitry stores operating systems, hardware-trust applications, contact applications, hardware-trust codes, and the like. In some examples, hardware-trust server 140 comprises NFV hardware that hosts NFV virtual layers, MANO, VNFs, and the like. Hardware-trust server 140 may be integrated within wireless network slice 110 and/or distributed ledger nodes 130.

Distributed ledger client 120 has a read-only hardware-trust code that is physically embedded in its circuitry. Distributed ledger client 120 uses the code to maintain hardware-trust with wireless network slice 110. Ledger client 120 reads and encodes the hardware-trust code and transfers the encoded hardware-trust code to hardware-trust server 140. Hardware-trust server 140 validates the encoded hardware-trust code by repeating the same encoding and comparing the encoded results or by decoding of the hardware-trust code and comparing decoded hardware-trust codes. A code match indicates hardware trust, and a code mismatch indicates no hardware trust.

When hardware-trust is established, hardware-trust server 140 generates and transfers hardware-trust digital certificates to distributed ledger client 120. Hardware-trust server 140 also transfers contact information for wireless network slice 110 to distributed ledger client 120 when hardware-trust validation is successful. In response, ledger client 140 transfers the hardware-trust digital certificates to wireless network slice 110 using the contact information. Wireless network slice 110 validates the hardware-trust digital certificates with a digital key for hardware-trust server 140. The hardware-trust digital certificates have a time-to-live, and the above hardware-trust process is periodically repeated to maintain hardware-trust for distributed ledger client 120 with wireless network slice 110.

Distributed ledger client 120 also maintains hardware-trust with ledger nodes 130. Hardware-trust server 140 transfers hardware-trust digital certificates and contact information for ledger nodes 130 to ledger client 120 when hardware-trust validation is successful. Ledger client 140 also transfers the hardware-trust digital certificates to ledger nodes 130 using the contact information. Ledger nodes 130 validate the hardware-trust digital certificates with a digital key for hardware-trust server 140. The hardware-trust digital certificates have a time-to-live, and the above hardware-trust process is periodically repeated to maintain hardware-trust for ledger client 120 with ledger nodes 130.

In addition, wireless network slice 110 may maintain hardware-trust with ledger client 140. Wireless network slice 110 may obtain contact information for ledger client 140 from hardware-trust server 140 upon hardware-trust establishment. Ledger nodes 130 may maintain hardware-trust with ledger client 140, and ledger nodes 130 may obtain contact information for ledger client 140 from hardware-trust server 140 upon hardware-trust establishment. Ledger client 120 may maintain hardware-trust with wireless user devices 101-103, and wireless user devices 101-103 may maintain hardware-trust with ledger client 120. Ledger client 120 and wireless user devices 101-103 may also obtain contact information for one another from hardware-trust server 140 upon hardware-trust establishment.

Wireless network slice 110 delivers wireless communication services to wireless user devices 101-103. Wireless network slice 110 generates slice data that characterizes the service delivery. The slice data may indicate: wireless user devices 101-103, network slice 110, ledger client 120, and components in wireless network slice 110 like computer hardware and software, NFV virtual layer components, NFV VNFs, and NFV Forwarding Graphs (FGs). Wireless network slice 110 transfers the slice data to ledger client 120 when ledger client 120 maintains hardware-trust with wireless network slice 110. Wireless network slice 110 does not transfer slice data to ledger client 120 if ledger client 120 loses hardware-trust with wireless network slice 110.

Ledger client 120 transfers the slice data to ledger nodes 130. In some examples, ledger client 120 only transfers the slice data to ledger nodes 130 when wireless network slice 110 maintains hardware-trust with ledger client 120. In some examples, ledger client 120 only transfers the slice data to ledger nodes 130 when ledger nodes 130 maintain hardware-trust with ledger client 120. Ledger nodes 130 process the slice data with ledger applications and log the slice data when ledger client 120 maintains hardware-trust with ledger nodes 130. Ledger nodes 130 do not process or log the slice data when ledger client 120 loses hardware-trust with ledger nodes 130.

Figure 2:
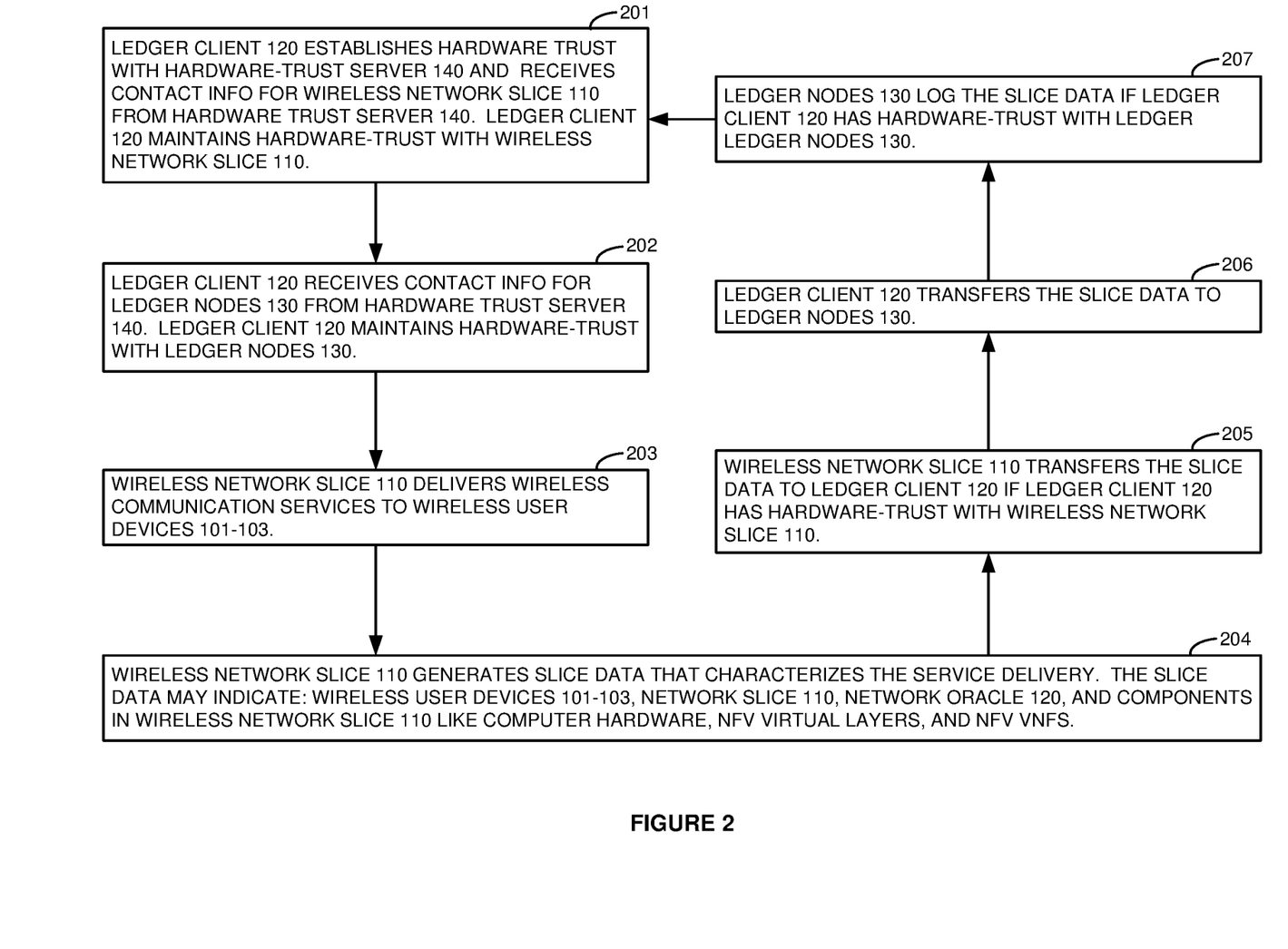
FIG. 2 illustrates the operation of the wireless data network to store the slice data from the wireless network slices in the distributed ledger nodes.

FIG. 2 illustrates the operation of wireless data network 100 to store the slice data from wireless network slice 110 in ledger nodes 130. Ledger client 120 establishes hardware-trust with hardware-trust server 140. In response, ledger client 102 receives contact information for wireless network slice 110. Ledger client 120 maintains hardware-trust with wireless network slice 110 (201). Ledger client 120 also receives contact information for ledger nodes 130 in response to hardware-trust establishment. Ledger client 120 maintains hardware-trust with ledger nodes 130 (202).

Wireless network slice 110 delivers wireless communication services to wireless user devices 101-103 (203). Wireless network slice 110 generates slice data that characterizes this service delivery (204). The slice data may indicate: wireless user devices 101-103, network slice 110, ledger client 120, and components in wireless network slice 110 like computer hardware, NFV virtual layers, and NFV VNFs. Wireless network slice 110 transfers the slice data to ledger client 120 if and when ledger client 120 has hardware-trust with wireless network slice 110 (205). Ledger client 120 transfers the slice data to ledger nodes 130 (206). Ledger nodes 130 process and log the slice data if and when ledger client 120 has hardware-trust with ledger nodes 130 (207).

Figure 3:
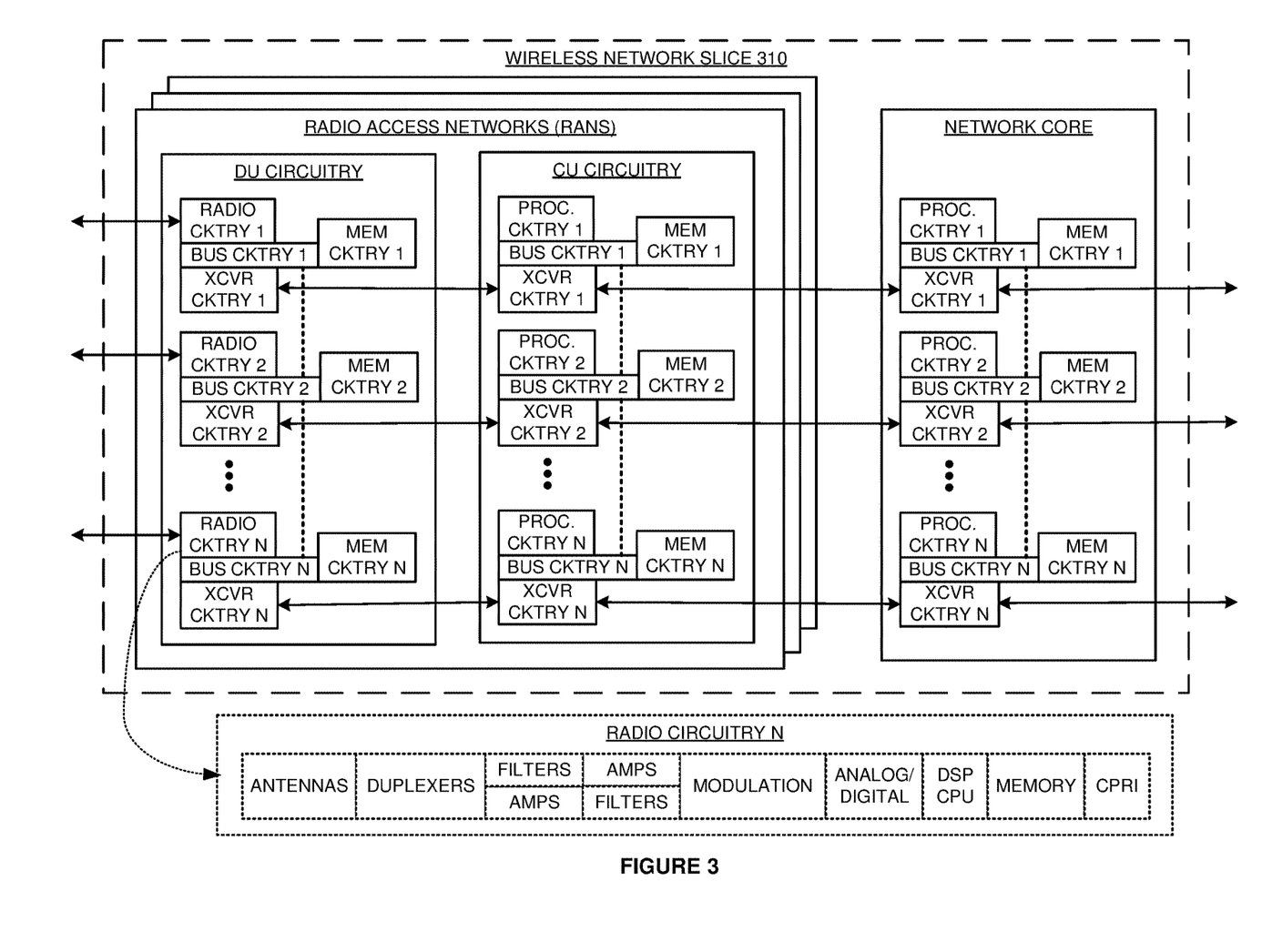
FIG. 3 illustrates a hardware architecture for a wireless network slice.

FIG. 3 illustrates a hardware architecture for a wireless network slice 310. The hardware architecture is exemplary and other hardware architectures could be used. Wireless network slice 310 comprises Radio Access Networks (RANs) and a network core. The network core comprises processing (proc.) circuitry 1-N, memory circuitry 1-N, Transceiver (XCVR) circuitry 1-N, and bus circuitry 1-N. Processing circuitry 1 in the DU circuitry may have a read-only hardware-trust code. Bus circuitry 1 couples processing circuitry 1, memory circuitry 1, and XCVR circuitry 1. Bus circuitry 2-N, radio circuitry 2-N, memory circuitry 2-N, and XCVR circuitry 2-N may be respectively coupled together in a similar manner. Bus circuitry 1-N is coupled together. Memory circuitry 1-N stores user data, operating systems, and VNFs for hardware-trust, slice controller, LGW, AMF, UPF, SMF, PCF, AUSF, UDM, MME, SGW, PGW, PCRF, HSS, PCRF, and IMS. In the network core, processing circuitry 1-N executes VNF virtual layers and VNFs to drive the exchange of data between the RANs and various systems like the internet.

The RANs comprise Distributed Unit (DU) circuitry and Common Unit (CU) circuitry. The DU circuitry comprises radio circuitry 1-N, memory circuitry 1-N, XCVR circuitry 1-N, and bus circuitry 1-N. Bus circuitry 1 couples radio circuitry 1, memory circuitry 1, and XCVR circuitry 1. Bus circuitry 2-N, radio circuitry 2-N, memory circuitry 2-N, and XCVR circuitry 2-N may be respectively coupled together in a similar manner. Bus circuitry 1-N is coupled together. Radio circuitry 1-N is wirelessly coupled to wireless user devices. Radio circuitry 1-N each comprise antennas, duplexers, filters, amplifiers, modulators, analog/digital interfaces, DSPs/CPUs, memory, and typically a radio interface like Common Public Radio Interface (CPRI). In radio circuitry 1-N, the memories store DSP firmware and/or software. The DSPs execute their firmware/software to drive the exchange of user data between the antennas and the radio circuitry memories. In the DU circuitry, memory circuitry 1-N stores user data, operating systems, and network applications like hardware-trust, slice control, ledger access, PHY, MAC, RLC, PDCP, RRC and SDAP. The DU CPUs execute their operating systems and network applications to drive the exchange of data between the radio circuitry memories and the CU circuitry.

The CU circuitry comprises processing circuitry 1-N, memory circuitry 1-N, XCVR circuitry 1-N, and bus circuitry 1-N. Processing circuitry 1 in the CU circuitry may have a read-only hardware-trust code. Bus circuitry 1 couples processing circuitry 1, memory circuitry 1, and XCVR circuitry 1. Bus circuitry 2-N, processing circuitry 2-N, memory circuitry 2-N, and XCVR circuitry 2-N may be respectively coupled together in a similar manner. Bus circuitry 1-N is coupled together. In the CU circuitry, memory circuitry 1-N stores user data, operating systems, and network applications or VNFs like hardware-trust, slice control, ledger access, PHY, MAC, RLC, PDCP, RRC and SDAP. Processing circuitry 1-N executes their operating systems and apps/VNFs to drive the exchange of data between the DU circuitry and the network core. XCVR circuitry 1-N of the CU circuitry is coupled to respective XCVR circuitry 1-N of the DU circuitry and to respective XCVR circuitry 1-N of the network core.

In the RANs, radio circuitry antennas receive wireless UL signals from the wireless user devices and transfer corresponding electrical UL signals through the duplexers to the amplifiers. The amplifiers boost the UL signals for filters which attenuate unwanted energy. In modulation, demodulators down-convert the UL signals from their carrier frequencies. The analog/digital interfaces convert the analog UL signals into digital UL signals for the DSPs. The DSPs recover UL data and signaling from the UL signals and transfer the recovered UL data and signaling to the memory circuitry. The CPUs execute their OS and network applications to process the UL data and signaling. The network applications drive the DU circuitry to transfer UL data and signaling from its memory circuitry 1-N over its XCVR circuitry 1-N to XCVR circuitry 1-N and memory circuitry 1-N in the CU circuitry.

In the CU circuitry, processing circuitry 1-N executes their OS and apps/VNFs to process the UL data and signaling. The apps/VNFs drive the CU circuitry to transfer UL data and signaling from its memory circuitry 1-N over its XCVR circuitry 1-N to XCVR circuitry 1-N and memory circuitry 1-N in the network core. In the network core, processing circuitry 1-N executes their NFV virtual layers and VNFs to process the UL data and signaling. The VNFs drive the network core to transfer UL data from core memory circuitry 1-N over XCVR circuitry 1-N to the various connected systems.

In the network core, XCVR circuitry 1-N receives Downlink (DL) data from the various connected systems and stores the DL data in its memory circuitry 1-N. Processing circuitry 1-N executes the NFV virtual layers and VNFs to process the DL data. The VNFs drive processing circuitry 1-N to transfer DL data and signaling from its memory circuitry 1-N over its XCVR circuitry 1-N to XCVR circuitry 1-N and memory circuitry 1-N in the CU circuitry. Processing circuitry 1-N executes their OS and apps/VNFs to process the DL data and signaling. The apps/VNFs drive the CU circuitry to transfer DL data and signaling from its memory circuitry 1-N over its XCVR circuitry 1-N to XCVR circuitry 1-N, memory circuitry 1-N, and network applications in the DU circuitry.

In the DU circuitry, radio circuitry 1-N executes their OS and network applications to process the DL data and signaling. The network applications drive the DU circuitry to transfer DL data and signaling from its memory circuitry 1-N over its radio circuitry 1-N to the wireless user devices. To perform the data transfer from radio circuitry 1-N, the DSPs retrieve DL data and signaling and transfer corresponding DL signals to the analog/digital interface. The analog/digital interface converts the digital DL signals into analog DL signals for the modulators. The modulators up-convert the DL signals to their carrier frequencies. The amplifiers boost the UL signals for the filters which attenuate unwanted out-of-band energy. The filters transfer the DL signals through the duplexers to the antennas. The electrical DL signals drive the antennas to emit corresponding wireless DL signals to the wireless user devices.

Figure 4:
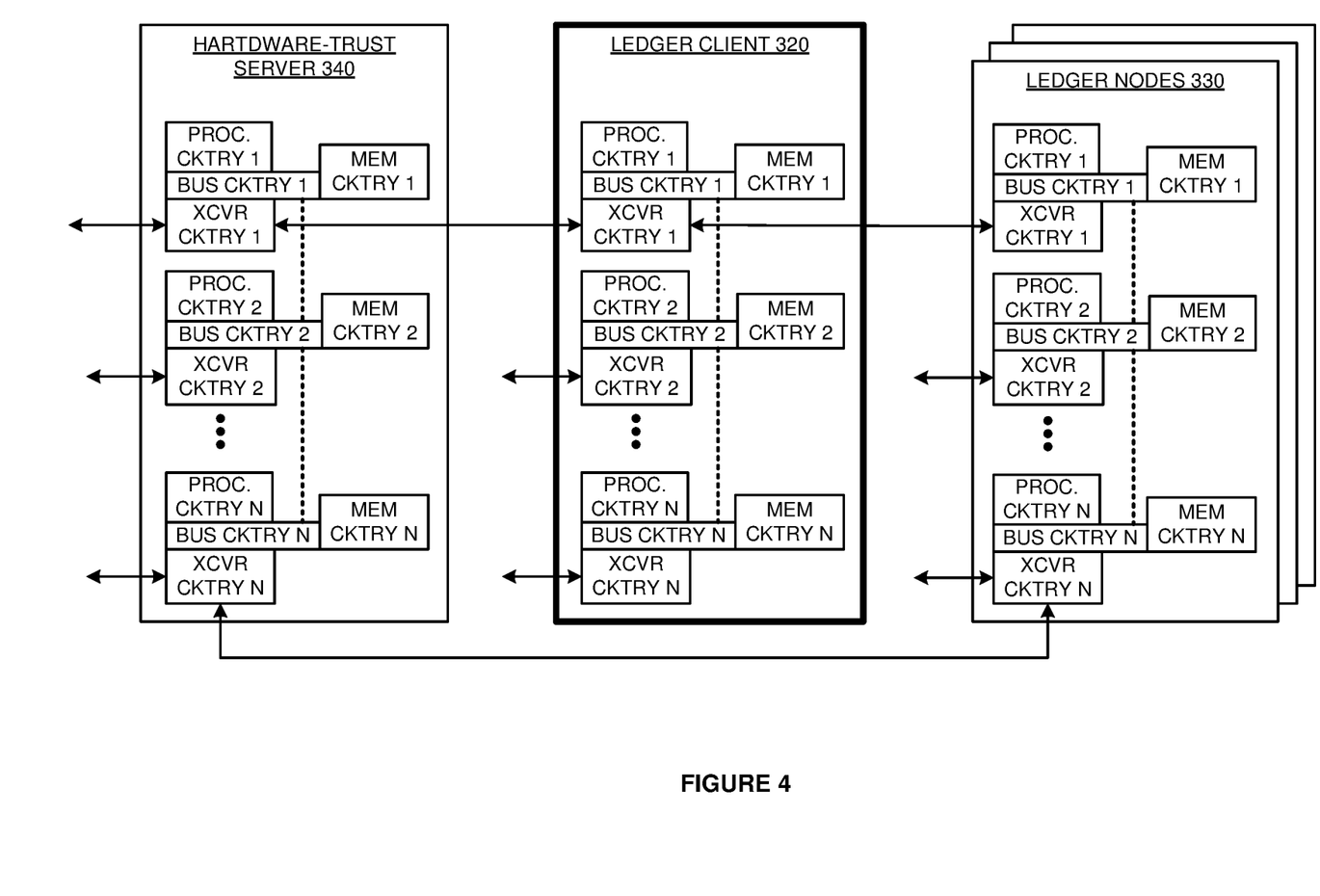
FIG. 4 illustrates a hardware architecture for a hardware-trusted distributed ledger client and distributed ledger nodes.

FIG. 4 illustrates a hardware architecture for ledger client 320, ledger nodes 330, and hardware-trust server 340. The hardware architecture is exemplary and other hardware architectures could be used. Ledger client 320 comprises processing circuitry 1-N, memory circuitry 1-N, XCVR circuitry 1-N, and bus circuitry 1-N. Advantageously, processing circuitry 1 in ledger client 320 has a read-only hardware-trust code. Bus circuitry 1 couples processing circuitry 1, memory circuitry 1, and XCVR circuitry 1. Bus circuitry 2-N, radio circuitry 2-N, memory circuitry 2-N, and XCVR circuitry 2-N may be respectively coupled together in a similar manner. Bus circuitry 1-N is coupled together. In ledger client 320 memory circuitry 1-N stores user data, operating systems, and applications for hardware trust operations and slice data transfers. Processing circuitry 1-N executes their operating systems and applications to drive hardware-trust, client pairing, and slice data exchanges.

Ledger nodes 330 comprise multiple computers that are interconnected by one or more data networks as indicated by the multiple ledger boxes going into the page. Each of the computers in ledger nodes 330 typically comprises processing circuitry 1-N, memory circuitry 1-N, XCVR circuitry 1-N, and bus circuitry 1-N. Processing circuitry N in each of ledger nodes 330 may have their own read-only hardware-trust code. Bus circuitry 1 couples processing circuitry 1, memory circuitry 1, and XCVR circuitry 1. Bus circuitry 2-N, radio circuitry 2-N, memory circuitry 2-N, and XCVR circuitry 2-N may be respectively coupled together in a similar manner. Bus circuitry 1-N is coupled together. In ledger nodes 330 memory circuitry 1-N stores operating systems, and applications for hardware-trust, endorsement, order service, slice control, chain code, and database storage. Processing circuitry 1-N executes their operating systems and applications to drive hardware-trust, client pairing, and slice data storage.

Hardware-trust server 340 comprises processing circuitry 1-N, memory circuitry 1-N, XCVR circuitry 1-N, and bus circuitry 1-N. Bus circuitry 1 couples processing circuitry 1, memory circuitry 1, and XCVR circuitry 1. Bus circuitry 2-N, radio circuitry 2-N, memory circuitry 2-N, and XCVR circuitry 2-N may be respectively coupled together in a similar manner. Bus circuitry 1-N is coupled together. In hardware-trust server 340, memory circuitry 1-N stores hardware-trust codes, operating systems, and applications for hardware-trust validation, client pairing, digital-certificate issuance, and slice control. Processing circuitry 1-N executes their operating systems and applications to drive hardware-trust operations, client pairing, slice control and digital-certificate issuance.

In operation, processing circuitry 1 in hardware trust server 340 transfers random number challenges to ledger client 320 over bus circuitry 1 and XCVR circuitry 1. Processing circuitry 1 in ledger client 320 hashes its embedded hardware trust code with the random number to generate a hardware-trust result that is transferred back to hardware-trust server 340 over bus circuitry 1 and XCVR circuitry 1. In hardware trust server 340, processing circuitry 1 decodes the hash result and compares the hardware-trust code from ledger client 320 to a stored and legitimate copy of the hardware trust code for ledger client 320 to validate hardware-trust for ledger client 320. Processing circuitry 1 in hardware trust server 340 generates a hardware-trust digital certificate with a time-to-live and transfers the hardware-trust digital certificate to ledger client 320 over bus circuitry 1 and XCVR circuitry 1. This process is periodically repeated to maintain fresh hardware-trust digital certificates for ledger client 320 in wireless network slice 310. In response to successful hardware-trust, processing circuitry 1 in hardware trust server 340 also generates contact information for wireless network slice 310. Hardware trust server 340 transfers the contact information for wireless network slice 310 to ledger client 320 over bus circuitry 1 and XCVR circuitry 1.

In ledger client 320, memory circuitry 1 receives the hardware-trust digital certificates and contact information. Processing circuitry 1 sends the hardware-trust digital certificate to wireless network slice 310 based on the contact information over bus circuitry 1, bus circuitry N, processing circuitry N, and XCVR circuitry N. In wireless network slice 310, memory circuitry 1 receives the hardware-trust digital certificates and processing circuitry 1 validates the certificates with a digital key for hardware-trust server 340.

In response to successful hardware-trust, processing circuitry 1 in hardware trust server 340 also generates contact information for ledger nodes 330. Hardware trust server 340 transfers the contact information for ledger nodes 330 to ledger client 320 over bus circuitry 1 and XCVR circuitry 1. In ledger client 320, processing circuitry 1 sends the hardware-trust digital certificate to distributed leger 330 based on the contact information over bus circuitry 1 and XCVR circuitry 1. In ledger nodes 330, memory circuitry 1 receives the hardware-trust digital certificates and processing circuitry 1 validates the certificates with a digital key for hardware-trust server 340. The process is periodically repeated to maintain freshly validated hardware-trust digital certificates for ledger client 320 in ledger nodes 330.

When hardware-trust is maintained, wireless network slice 310 transfers slice data to ledger client 320 over bus circuitry N and XCVR circuitry N. In ledger client 320, processing circuitry N transfers the slice data from memory circuitry N to ledger nodes 330 over processing circuitry 1, bus circuitry 1, and XCVR circuitry 1. When ledger client 320 maintains hardware-trust with ledger nodes 330, processing circuitry 1 reaches a consensus on the new slice data across ledger nodes 330 over processing circuitry 2, bus circuitry 2, and XCVR circuitry 2. Processing circuitry 1 logs the slice data in a distributed database in memory circuitry 1. Processing circuitry 1 executes a ledger application that typically generates data outputs. Processing circuitry 1 reaches a consensus on the data outputs across ledger nodes 330 in a like manner and transfers the data outputs to ledger client 340 over bus circuitry 1 and XCVR circuitry 1. In ledger nodes 330, processing circuitry 1 logs the data outputs in the distributed database in memory circuitry 1.

Figure 5:
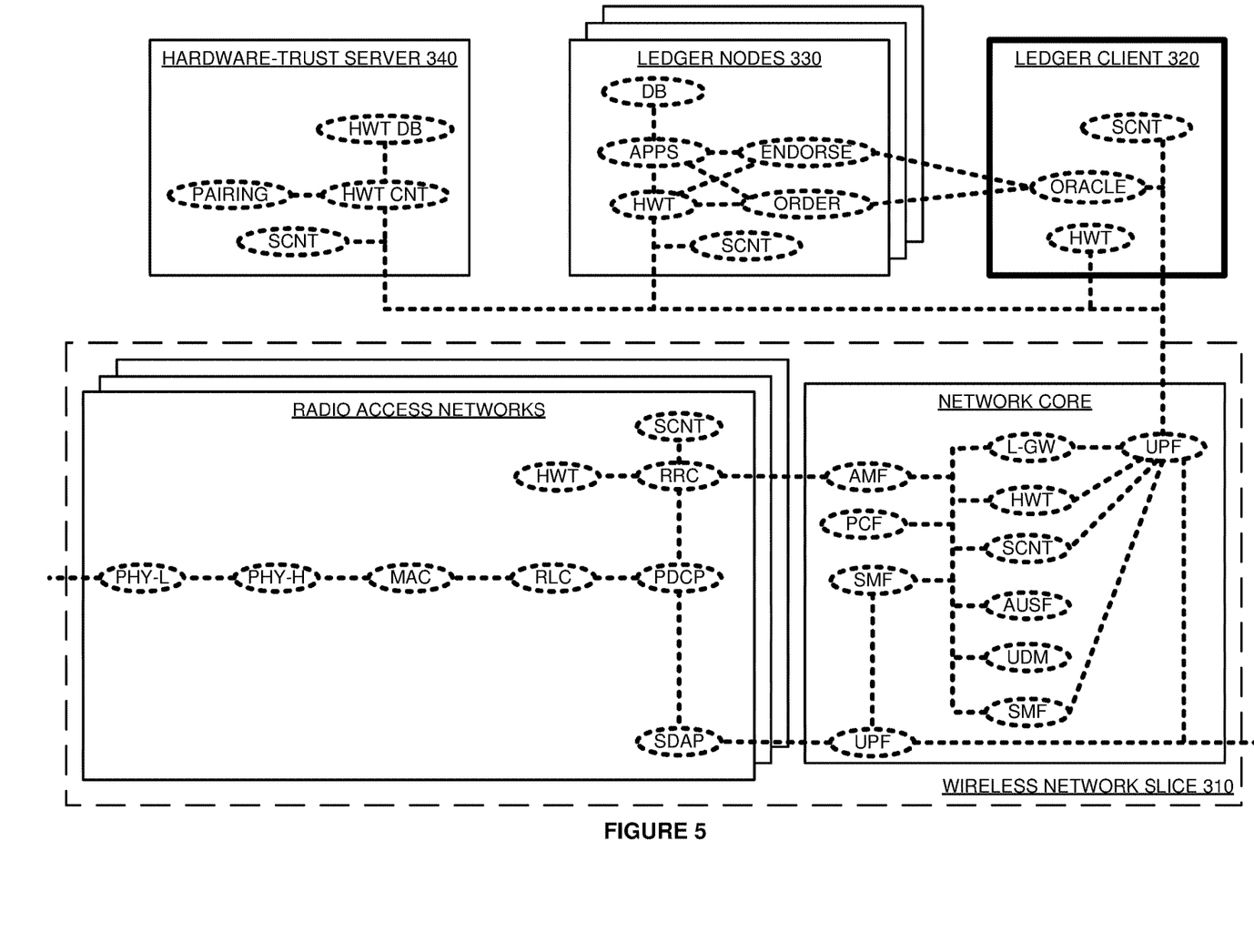
FIG. 5 illustrates a software architecture for a wireless network slice, hardware-trusted distributed ledger client, and distributed ledger nodes.

FIG. 5 illustrates a software architecture for wireless network slice 310, ledger client 320, ledger nodes 330, and hardware-trust server 340. The software architecture is exemplary and other software architectures could be used. Wireless network slice 310 comprises Radio Access Networks (RANs) and a network core. The RANs may be Fifth Generation New Radio (5GNR), Long Term Evolution (LTE), Institute of Electrical and Electronic Engineers (IEEE) 802.11 (WIFI), and the like. The network core may be Fifth Generation Core (5GC), LTE, and the like. The RANs comprise operating systems and/or NFV virtual layers. The RANs also comprise apps/VNFs for Hardware-Trust (HWT), Slice Control (SCNT), PHY-LOW (PHY-L), PHY-HIGH (PHY-H), MAC, RLC, PDCP, RRC, and SDAP. The DU circuitry hosts the PHY-L, and the DU or the CU circuitry hosts the PHY-H, MAC, RLC, PDCP, RRC, and SDAP depending on the DU/CU split option that is used.

The network core comprises operating systems and/or NFV virtual layers along with MANO and VNFs. The NFV virtual layers comprise operating systems, hypervisors, virtual switches, virtual machines, NFV MANO interfaces, and the like. The NFV VNFs comprise network functions like Ledger Gateway (L-GW), Hardware-Trust (HWT), Slice Controller (SCNT), Access and Mobility Management Functions (AMF), Authentication Server Function (AUSF), Unified Data Management (UDM), Policy Control Function (PCF), Session Management Function (SMF), Application Function (AF), and possibly other networking functions.

In the RANs of network slice 310, the PHY-L exchanges data and signaling with wireless user devices. The PHY-L component performs functions like packet formation/deformation, windowing/de-windowing, guard-insertion/guard-deletion, and Fast Fourier Transforms (FFTs)/Inverse FFTs (IFFTs), data mapping/de-mapping, interleaving/de-interleaving, parsing/de-parsing, Forward Error Correction (FEC) encoding/decoding, control insertion/removal, Resource Element (RE) mapping/de-mapping, precoding, layer mapping/de-mapping, modulation mapping/de-mapping, channel estimation, channel equalization, and Inverse Discrete Fourier Transforms (IDFT). The PHY-L exchanges data and signaling with the PHY-H. The PHY-H performs tasks like scrambling/descrambling, FEC encoding/decoding, parsing/de-parsing, interleaving/de-interleaving, data mapping/de-mapping, channel coding/decoding, rate matching/de-matching, modulation mapping/de-mapping, layer mapping/de-mapping, IDFT, channel estimation, channel equalization, precoding, and RE mapping/de-mapping.

The MAC processes user data to map between the MAC transport channels and MAC logical channels. The MAC determines buffer status, power headroom, channel quality, Hybrid Automatic Repeat Request (HARQ) acknowledgements, UE identifiers, and the like. To perform HARQ on the UL, the MAC transfers ACKs for UL data and signaling. To perform random access, the MAC processes access signaling to identify the wireless user devices and initiate scheduling. To perform power control, the MAC processes channel quality and power headroom to adjust user power to overcome poor channel quality within headroom and interference limits. To perform scheduling, the MAC processes radio channel quality, buffer status, and radio interference to assign data and signaling to wireless payloads. The MAC signals the schedule to the wireless user devices. The MAC processes performance data like data-rate, delay, error-rate, and jitter to maintain Quality-of-Service (QoS) for the user devices.

The RLC maps between the MAC logical channels and Protocol Data Units (PDUs). The RLC performs ARQ for the UL data and signaling by transferring UL ACKs. The RLC performs ARQ for the DL by retransmitting DL data and signaling that was not properly received. The RLC adds sequence numbers on the DL and performs resequencing on the UL. The RLC performs segmentation and resegmentation. The RLC exchanges data and signaling with the PDCP. The PDCP maps between the PDUs from the RLC and Service Data Units (SDUs) for the RRC/SDAP. The PDCP handles security by applying ciphering. The PDCP performs header compression and decompression. The PDCP adds sequence numbers and re-orders received SDUs in their proper sequence. The PDCP eliminates duplicate UL data. The RRC exchanges SDUs that carry signaling and with the PDCP.

The RRC interacts with the AMF to establish and terminate data sessions. The RRC supports N1 messaging between AMFs and wireless user devices. The RRC directs the broadcast of system information to the wireless user devices. The RRC component transfers paging to the wireless user devices. The RRC handles security and key management. The RRC component handles handover operations. The RRC manages device reporting and QoS.

The SDAP exchanges SDUs that carry data with the PDCP. The SDAP exchanges data with the UPF which exchanges the data with other systems under the control of the SMF. The SDAP maps between the SDUs and QoS flows. The SDAP marks QoS flows with the proper QoS. In the RANs, the above-software components may generate and transfer slice data to ledger client 320 over the L-GW in the network core.

In the network core, a UPF exchanges user data between the SDAP and other systems under the control of an AMF and an SMF. The AMF and SMF access the PCF for user policies and quality-of-service. The AMF and SMF access the AUSF for user authentication and authorization. The AMF and SMF access the UDM for user content storage. The above-software components may generate and transfer slice data to ledger client 320 over the L-GW. The L-GW only transfers slice data to ledger client 320 when ledger client 320 maintains hardware-trust with the network core HWT. A UPF exchanges the slice data between the L-GW and ledger client 320, exchanges the hardware-trust data between the L-GW and hardware-trust server 340, and exchanges slice control data between the L-GW and client 320, nodes, 330, and hardware-trust server 340.

In hardware-trust server 340, the Hardware-Trust Controller (HWT CNT) receives HWT requests from ledger client 320 and transfers random number challenges to ledger client 320. In hardware-trust server 340, the HWT CNT receives an encoded version of the hardware-trust code for ledger client 320 based on the random number. The HWT CNT validates the encoded hardware-trust code by repeating the same encoding and comparing the encoded results for a match that indicates hardware-trust or by decoding of the hardware-trust code and comparing decoded hardware-trust codes for a match that indicates hardware-trust. The HWT CNT has a HWT DB that stores the hardware-trust codes for the computer hardware in ledger client 320 and perhaps for the network core, RANs, user devices, and ledger nodes 330.

When hardware-trust is established in server 340, the HWT CNT generates and transfers a hardware-trust digital certificate (with a time-to-live) to ledger client 320. When hardware-trust is established, the pairing system selects and transfers contact information to ledger client 320. The contact information comprises network addresses for the HWT, endorsement, and order service in ledger nodes 330. The contact information also comprises network addresses for the HWT, SCNT, and L-GW in the network core. The contact information may also comprise network addresses for the RANs and wireless user devices.

In distributed ledger client 320, the HWT is configured with contact information for hardware-trust server 340. The HWT uses the contact information to establish hardware-trust with hardware-trust server 340. The HWT receives hardware-trust digital certificates from hardware-trust server 340. The HWT transfers the hardware-trust digital certificates to ledger nodes 330 and to wireless network slice 310. The HWT may transfer the hardware-trust digital certificates to the RANs and/or the wireless user devices. The HWT may receive and validate hardware-trust digital certificates from ledger nodes 330, the network core, the RANs, and/or the wireless user devices.

In the RANs, the HWT may receive hardware-trust digital certificates from ledger client 320 and validate the digital certificates with a key for hardware trust server 340. The HWT in the RANs may also establish hardware-trust through hardware-trust server 340 and receive hardware-trust digital certificates from hardware-trust server 340. The HWT may transfer the hardware-trust digital certificates to ledger client 320.

In the network core, the HWT receives hardware-trust digital certificates from ledger client 320 and validates the digital certificates with a key for hardware trust server 340. The HWT in the core may establish hardware-trust through hardware-trust server 340 and receive hardware-trust digital certificates from hardware-trust server 340. The HWT may transfer the hardware-trust digital certificates to ledger client 320.

In ledger client 320, the oracle receives new slice data from the L-GW. The oracle transfers the slice data to ledger nodes 330. The oracle may only transfer the slice data when ledger nodes 330 and/or wireless network slice 310 maintain hardware-trust with ledger client 320. Ledger client 320 receives endorsements from ledger nodes 330. The oracle transfers the slice data and the endorsements to ledger nodes 330 for the order service. In ledger client 320, the software components may generate and transfer slice data to ledger nodes 330.

In ledger nodes 330, the HWT receives hardware-trust digital certificates from ledger client 320 and validates the digital certificates with a key for hardware trust server 340. The HWT may establish hardware-trust through hardware-trust server 340 and receive hardware-trust digital certificates from hardware-trust server 340. The HWT may transfer the hardware-trust digital certificates to ledger client 320. In ledger nodes 330, the endorser receives the new slice data from the oracle in ledger client 320. The endorser endorses the slice data when ledger client 320 maintains hardware-trust with the HWT in nodes 330. The endorsement may also entail having some of the ledger applications (apps) process the slice data to issue a data output that is processed for the endorsement per ledger application logic. The endorser endorses data outputs from the ledger applications when ledger client 320 maintains the hardware-trust. The endorser transfers the endorsements to the oracle in ledger client 320.

In ledger nodes 330, the order service receives the slice data and the endorsements from ledger client 320. The order service transfers the endorsed slice data to the order service in other ledger nodes 330. The ledger applications process the endorsed slice data to form a consensus and then process the slice data to generate a data output. The ledger applications form a consensus on the data output. When the consensus is formed (and ledger client 320 maintains hardware-trust), the ledger applications commit the slice data and data output to the ledger databases. The databases in ledger nodes 330 store the slice data and the data output in ledger blocks. When the consensus is formed (and hardware-trust maintained), the order service in ledger nodes 330 transfers the data outputs to ledger client 320. Although only a few connections are shown between ledger client 320 and ledger nodes 330, the oracle in ledger client 320 typically interacts with endorsers and order services in multiple ledger nodes 330.

Figure 6:
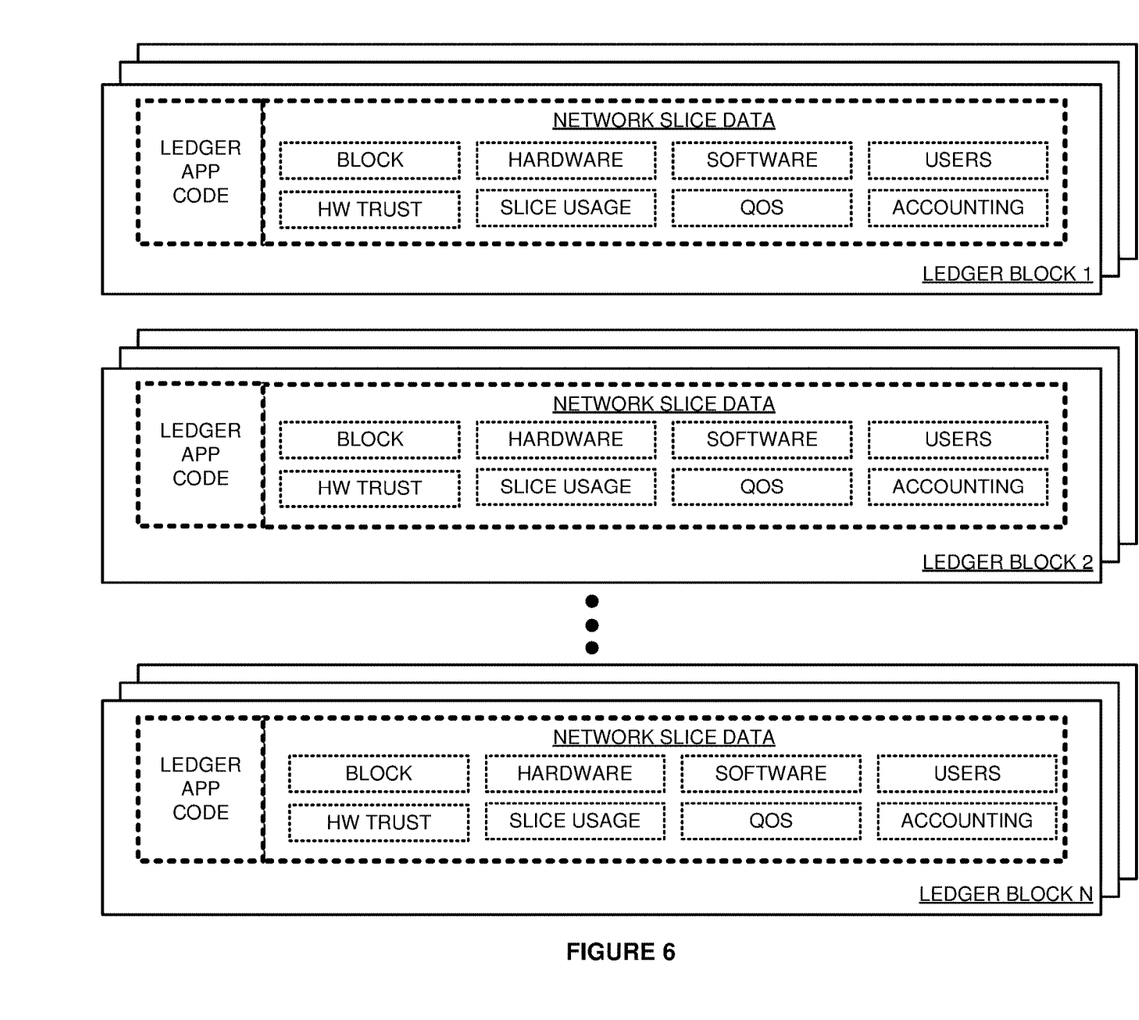
FIG. 6 illustrates distributed ledger blocks.

FIG. 6 illustrates ledger blocks for wireless network slice 310. Exemplary ledger blocks 1-N are shown, although ledger blocks may vary from this specific example. Ledger block 1 represents the genesis block for the wireless network slice. Ledger block 1 may be based on a genesis block template in a slice configuration or service description for the wireless network slice. Ledger blocks 1-N each comprise ledger application code and network slice data. The network slice data comprises block data, slice data, hardware data, software data, user data, usage data, QoS data, hardware trust data, accounting data, and typically other data. Although the network slice data changes over time in new ledger blocks, the ledger application code and the stored network slice data are immutable in ledger nodes 330. Thus, the immutable ledger application code is executed across multiple ledger nodes 330 to reach consensus on slice data, generate data output, reach consensus on the data output, store the slice data and the data output, and transfer the slice data and the data output.

In ledger blocks 1-N, the block data includes a hash of the previous block, a genesis block initiator ID, nonce, time stamps, roots, hashes, and the like. The hardware data indicates access nodes, fronthaul/backhaul circuits, NFVIs, network elements, and their CPUs, GPUs, flash drives, disk drives, Network Interface Cards (NICs), I/O ports, and the like. The software data indicates executing hardware, operating systems, virtual machines, networking applications, VNFs, MANO systems, ledger clients, slice controllers, and hardware trust servers. The user data identifies users and their user devices. The data usage indicates the dates/times and amounts of data usage for the users. The QoS data indicates quality metrics, alarms, terminations for the delivered communication service for the individual users. The hardware trust data indicates hardware trust validations and failures. The accounting data indicates user payments and credits for the usage.

Figure 7:
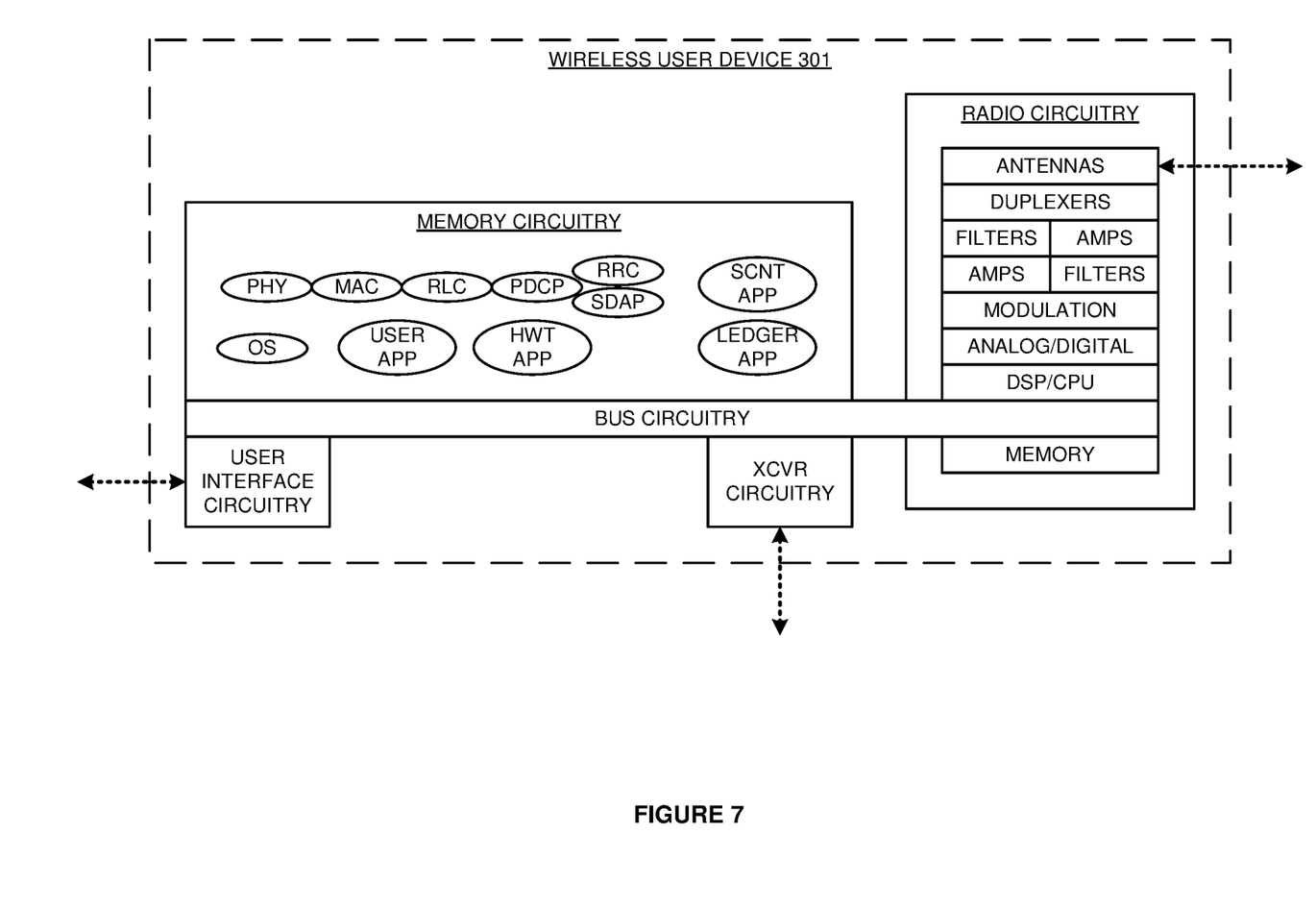
FIG. 7 illustrates a wireless user device.

FIG. 7 illustrates wireless user device 301. Wireless user device 301 is exemplary and other user devices could be used. Wireless user device 301 comprises radio circuitry, memory circuitry, XCVR circuitry, bus circuitry, and user interface circuitry. The bus circuitry couples the radio circuitry, memory circuitry, XCVR circuitry, and user interface circuitry. The radio circuitry comprises antennas, duplexers, filters, amplifiers, modulation, analog/digital interfaces, DSPs/CPUs, memory, and typically other components. In wireless user device 301, the memory circuitry stores user data, operating systems, user applications, and network applications like HWT, SCNT, ledger access, PHY, MAC, RLC, PDCP, RRC, and SDAP.

In the radio circuitry, the antennas wirelessly exchange user data with RANs in wireless network slice 310. The DSP executes firmware/software to drive the exchange of data between the radio circuitry memory and the antennas. The CPU executes the operating system and network applications to drive the exchange of data between the user interface circuitry, XCVR circuitry, memory circuitry, and the radio circuitry. The CPU executes the OS and user applications to generate user data or receive user data from the XCVR circuitry or user interface circuitry.

The CPU executes the HWT application to obtain hardware trust for user device 301 from hardware trust server 340 and receive hardware-trust digital certificates from hardware trust server 340. The CPU executes the HWT application to transfer the hardware trust digital certificates to requesting systems like ledger client 320. The CPU executes the hardware trust application to validate the hardware trust certificates of ledger client 320.

The CPU executes the SCNT application to interact with a network slice controller for provisioning and service control. The hardware and software components generate slice data like user ID, device ID, sensor readings, captured audio/video, times, locations, hardware-trust status, and the like. When ledger client 320 maintains hardware-trust with the HWT application in device 301, the CPU executes the ledger application to transfer the slice data to ledger client 320.

Figure 8:
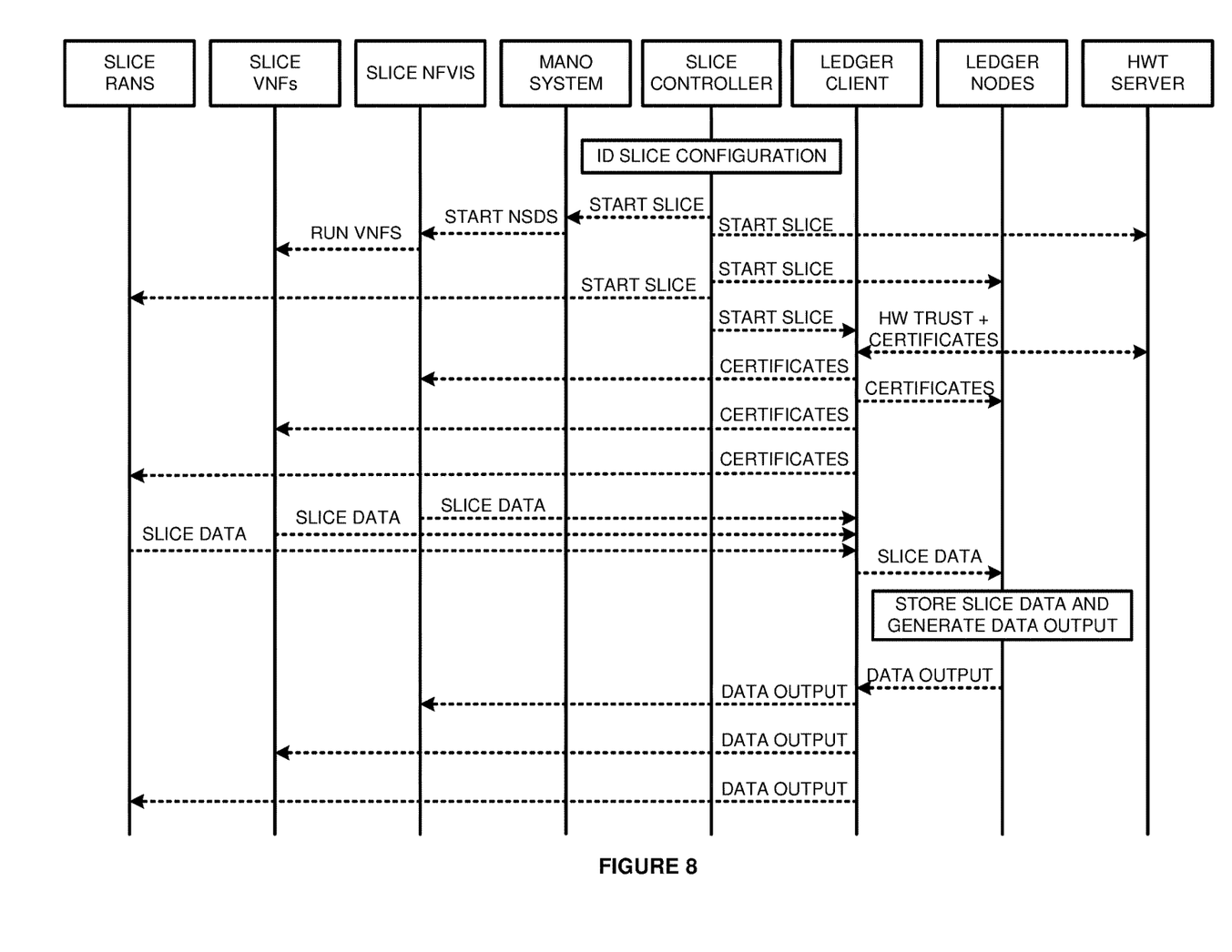
FIG. 8 illustrates the operation of a wireless data network to store slice data in distributed ledger nodes.

FIG. 8 illustrates the operation of a wireless data network to store slice data in ledger nodes. The operation is exemplary and other operations could be used. A slice controller identifies a slice configuration for a new wireless network slice. The slice configuration indicates slice requirements like RAN configurations, ledger configurations, HWT configurations, NFV Infrastructures (NFVIs), and Network Service Descriptors (NSDs). The NSDs detail the VNFs, Virtual Links (VLs), Physical Network Functions (PNFs), PNF Forwarding Graphs (PNFFGs), VNFs, and VNF Forwarding Graphs (VNFFGs), and the like for the slice. The slice configuration indicates applications for an HWT server, ledger nodes, and ledger client. The slice configuration also indicates a genesis ledger block and HWT keys for the wireless network slice.

The slice controller directs the MANO system to start the wireless network slice by implementing the NSDs for the slice based on the slice configuration. The MANO system directs the slice NFVIs to execute the NFV VNFs and other components for wireless network slice based on the NSDs. The NFVIs run the VNFs and other components for the slice. The MANO system directs the NFVIs and VNFs to interact with the RANs based on the PNFD and the PNFFG. The slice controller directs the HWT server to start HWT slice operations per the slice configuration. The slice controller directs the ledger nodes to start distributed ledgers per the slice configuration and based on the genesis block template. The slice controller directs the ledger client to start ledger interface operations per the slice configuration. The slice controller directs the RANs to implement the wireless network slice based on the slice configuration.

Responsive to the slice controller, the ledger client and HWT server interact to establish HWT for the ledger client and transfer hardware-trust digital certificates and contact information to the ledger client. The ledger client transfers hardware-trust digital certificates to the ledger nodes, NFVIs, VNFs, and RANs per the contact information. The ledger nodes, NFVIs, VNFs, and slice RANs validate the hardware-trust digital certificates with keys for the HWT server from the slice configuration. In some examples, the ledger nodes, NFVIs, VNFs, and/or RANs establish HWT and transfer hardware-trust digital certificates to the ledger client for HWT maintenance.

In response to HWT establishment and maintenance, the ledger client receives slice data from the NFVIs, VNFs, and RANs. The ledger client transfers the slice data to the ledger nodes for the endorsement and order service. The ledger nodes perform endorsement, consensus, application execution, and data storage. The ledger nodes transfer data output to the ledger client. The ledger client transfers the data output to the NFVIs, VNFs, and RANs per the contact information. In some examples, the RANs, ledger client, ledger nodes, and/or HWT server comprise VNFs that execute in the NFVIs per MANO system control responsive to the NSDs in the slice configuration. Advantageously, the ledger client comprises an efficient and effective interface between the NFVIs and the distributed ledger nodes.

The wireless data network circuitry described above comprises computer hardware and software that form a special-purpose machine-distributed ledger client circuitry that interfaces between the wireless network slices and distributed ledger nodes. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose distributed ledger client circuitry that interfaces between wireless network slices and distributed ledgers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a wireless user device with a wireless communication service from a wireless network slice, the method comprising:
   a Network Function Virtualization Infrastructure (NFVI) executing a Virtual Network Function (VNF) that comprises at least a portion of the wireless network slice;
   the VNF maintaining hardware-trust with a distributed ledger;
   the distributed ledger maintaining hardware-trust with the VNF;
   a Radio Access Network (RAN) maintaining hardware-trust with the distributed ledger;
   the distributed ledger maintaining hardware-trust with the RAN;
   the VNF delivering the wireless communication service over the RAN to the wireless user device from the wireless network slice and generating slice data that characterizes the service delivery;
   the RAN generating additional slice data that characterizes the service delivery;
   when the VNF maintains the hardware-trust with the distributed ledger, the VNF transferring the slice data to the distributed ledger;
   when the distributed ledger maintains the hardware-trust with the VNF, the distributed ledger storing the slice data;
   when the RAN maintains the hardware-trust with the distributed ledger, the RAN transferring the additional slice data to the distributed ledger; and
   when the distributed ledger maintains the hardware-trust with the RAN, the distributed ledger storing the additional slice data.

2. The method of claim 1 wherein:
   the NFVI comprises a read-only hardware-trust code; and
   the VNF maintaining the hardware-trust with the distributed ledger comprises the VNF transferring a hash of the read-only hardware-trust code.

3. The method of claim 1 wherein:
   the distributed ledger comprises a read-only hardware-trust code; and
   the distributed ledger maintaining the hardware-trust with the VNF comprises the distributed ledger transferring a hash of the read-only hardware-trust code.

4. The method of claim 1 wherein the NFVI comprises a read-only hardware-trust code and wherein the VNF maintaining the hardware-trust with the distributed ledger comprises:
   the VNF transferring a hash of the read-only hardware-trust code to a hardware-trust server that validates the hardware-trust code and returns a hardware-trust digital certificate signed by the hardware-trust server;
   the VNF transferring the hardware-trust digital certificate to the distributed ledger; and
   the distributed ledger verifying the hardware-trust digital certificate to maintain the hardware-trust for the VNF.

5. The method of claim 1 wherein the distributed ledger comprises a read-only hardware-trust code and wherein the distributed ledger maintaining the hardware-trust with the VNF comprises:
   the distributed ledger transferring a hash of the read-only hardware-trust code to a hardware-trust server that validates the hardware-trust code and returns a hardware-trust digital certificate signed by the hardware-trust server; and
   the distributed ledger transferring the hardware-trust digital certificate to the VNF; and
   the VNF verifying the hardware-trust digital certificate to maintain the hardware-trust for the distributed ledger.

6. The method of claim 1 wherein the slice data indicates the wireless user device and the VNF.

7. The method of claim 1 wherein the RAN comprises a read-only hardware-trust code and wherein the RAN maintaining hardware-trust with the distributed ledger comprises:
   the distributed ledger, the RAN transferring a hash of the read-only hardware-trust code to a hardware-trust server that validates the hardware-trust code and returns a hardware-trust digital certificate signed by the hardware-trust server;
   the RAN transferring the hardware-trust digital certificate to the distributed ledger; and
   the distributed ledger verifying the hardware-trust digital certificate to maintain the hardware-trust for the RAN.

8. The method of claim 1 further comprising:
   the NFVI maintaining hardware-trust with the distributed ledger;
   the distributed ledger maintaining hardware-trust with the NFVI;

the NFVI generating NFVI slice data that characterizes the service delivery;
when the NFVI maintains the hardware-trust with the distributed ledger, the NFVI transferring the NFVI slice data to the distributed ledger; and
when the distributed ledger maintains the hardware-trust with the NFVI, the distributed ledger storing the NFVI slice data.

9. The method of claim 8 wherein the NFVI slice data indicates computer hardware components in the wireless network slice.

10. The method of claim 8 wherein the NFVI slice data indicates NFVI virtual layer components in the wireless network slice.

11. A wireless communication network to serve a wireless user device with a wireless communication service from a wireless network slice, the wireless communication network comprising:
a Network Function Virtualization Infrastructure (NFVI) configured to execute a Virtual Network Function (VNF) that comprises at least a portion of the wireless network slice;
the VNF configured to maintain hardware-trust with a distributed ledger;
the distributed ledger configured to maintain hardware-trust with the VNF;
a Radio Access Network (RAN) configured maintain hardware-trust with the distributed ledger;
the distributed ledger configured to maintain hardware-trust with the RAN;
the VNF configured to deliver the wireless communication service over the RAN to the wireless user device from the wireless network slice and generate slice data that characterizes the service delivery;
the RAN configured to generate additional slice data that characterizes the service delivery;
when the VNF maintains the hardware-trust with the distributed ledger, the VNF configured to transfer the slice data to the distributed ledger;
when the distributed ledger maintains the hardware-trust with the VNF, the distributed ledger configured to store the slice data;
when the RAN maintains the hardware-trust with the distributed ledger, the RAN configured to transfer the additional slice data to the distributed ledger; and
when the distributed ledger maintains the hardware-trust with the RAN, the distributed ledger configured to store the additional slice data.

12. The wireless communication network of claim 11 wherein:
the NFVI comprises a read-only hardware-trust code; and
the VNF is configured to transfer a hash of the read-only hardware-trust code to maintain the hardware-trust with the distributed ledger.

13. The wireless communication network of claim 11 wherein:
the distributed ledger comprises a read-only hardware-trust code; and
the distributed ledger is configured to transfer a hash of the read-only hardware-trust code to maintain the hardware-trust with the VNF.

14. The wireless communication network of claim 11 wherein:
the NFVI comprises a read-only hardware-trust code;
the VNF is configured to transfer a hash of the read-only hardware-trust code to a hardware-trust server that validates the hardware-trust code and returns a hardware-trust digital certificate signed by the hardware-trust server;
the VNF is configured to transfer the hardware-trust digital certificate to the distributed ledger; and
the distributed ledger is configured to verify the hardware-trust digital certificate to maintain the hardware-trust for the VNF.

15. The wireless communication network of claim 11 wherein:
the distributed ledger comprises a read-only hardware-trust code;
the distributed ledger is configured to transfer a hash of the read-only hardware-trust code to a hardware-trust server that validates the hardware-trust code and returns a hardware-trust digital certificate signed by the hardware-trust server;
the distributed ledger is configured to transfer the hardware-trust digital certificate to the VNF; and
the VNF is configured to verify the hardware-trust digital certificate to maintain the hardware-trust for the distributed ledger.

16. The wireless communication network of claim 11 wherein the slice data indicates the wireless user device and the VNF.

17. The wireless communication network of claim 11 wherein:
the RAN comprises a read-only hardware-trust code;
the RAN is configured to transfer a hash of a hash of the read-only hardware-trust code to a hardware-trust server that validates the hardware-trust code and returns a hardware-trust digital certificate signed by the hardware-trust server;
the RAN is configured to transfer the hardware-trust digital certificate to the distributed ledger; and
the distributed ledger is configured to verify the hardware-trust digital certificate to maintain the hardware-trust for the RAN.

18. The wireless communication network of claim 11 further comprising:
the NFVI configured to maintain hardware-trust with the distributed ledger;
the distributed ledger configured to maintain hardware-trust with the NFVI;
the NFVI configured to generate NFVI slice data that characterizes the service delivery;
when the NFVI maintains the hardware-trust with the distributed ledger, the NFVI configured to transfer the NFVI slice data to the distributed ledger; and
when the distributed ledger maintains the hardware-trust with the NFVI, the distributed ledger configured to store the NFVI slice data.

19. The wireless communication network of claim 18 wherein the NFVI slice data indicates computer hardware components in the wireless network slice.

20. The wireless communication network of claim 18 wherein the NFVI slice data indicates NFVI virtual layer components in the wireless network slice.

* * * * *